May 21, 1963
R. L. DYKES ETAL
3,090,186
SPECIFIC WHEEL SUPPORT MEANS FOR
A COMBINATION MOWER AND TRIMMER
Filed Sept. 25, 1961
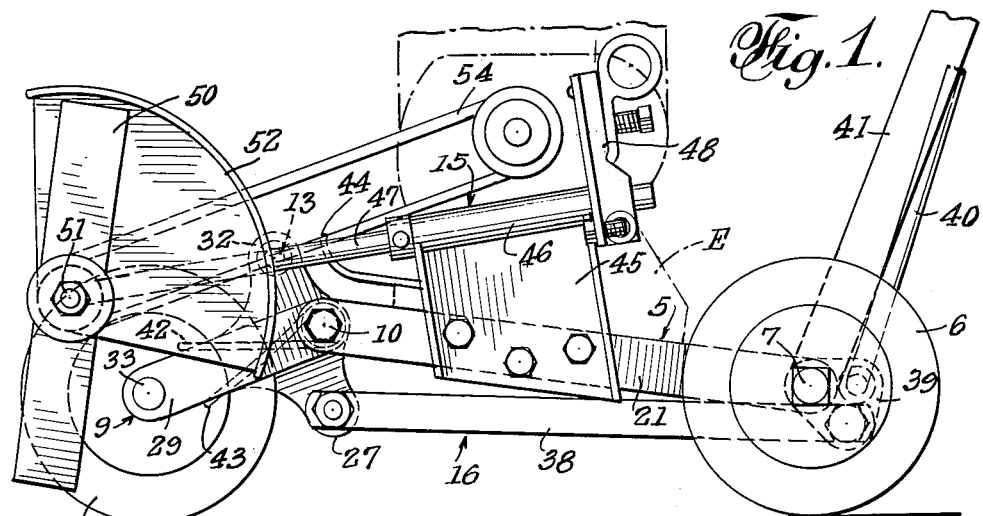
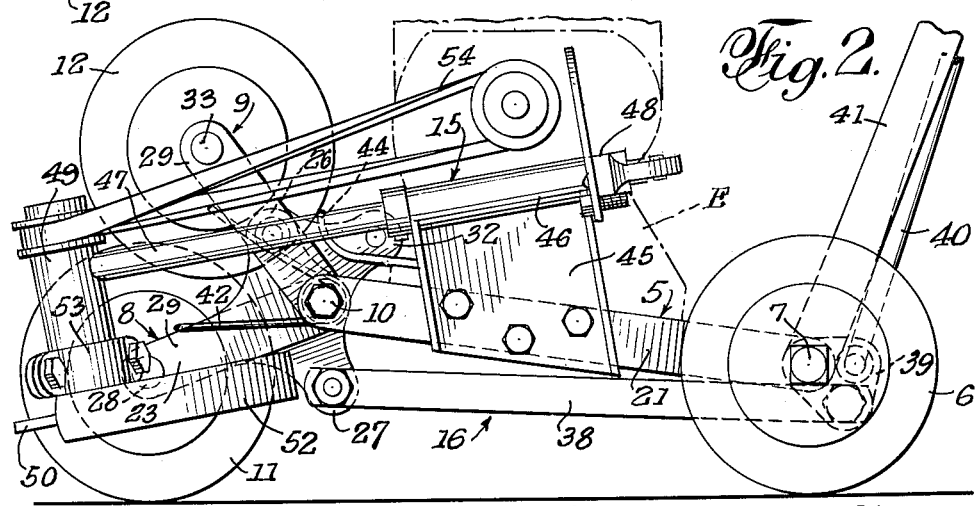
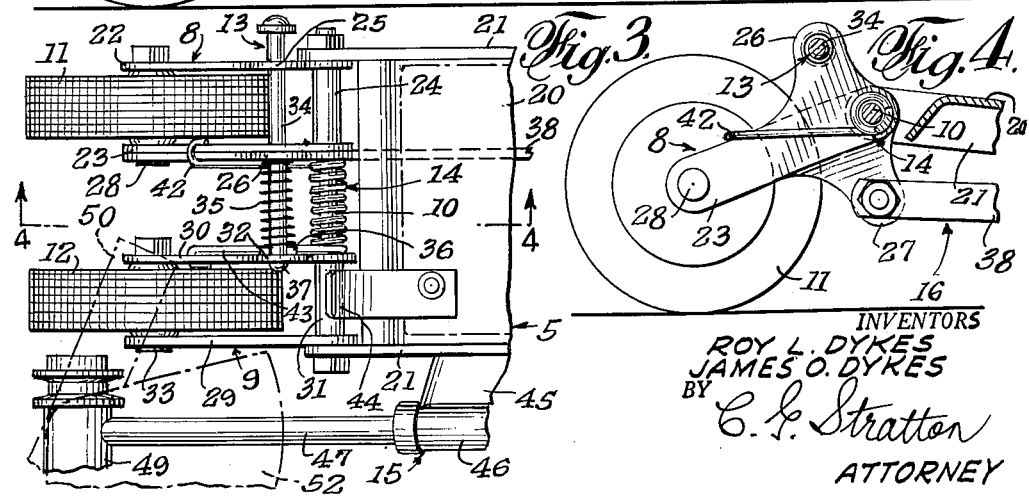
INVENTORS
ROY L. DYKES
JAMES O. DYKES
BY
C. E. Stratton
ATTORNEY 3,090,186
SPECIFIC WHEEL SUPPORT MEANS FOR A COMBINATION MOWER AND TRIMMER
Roy L. Dykes, Downey, and James O. Dykes, Compton, Calif., assignors to Power-Trim Co., Paramount, Calif., a corporation of California
Filed Sept. 25, 1961, Ser. No. 140,321
6 Claims. (Cl. 56—25.4)

This invention relates to a chassis construction for machines that combines grass-mowing and edge-trimming mechanism.

An object of the present invention is to provide a mower-trimmer chassis that is convertible, with easy facility, to mow a lawn or trim an edge, as desired.

Another object of the invention is to provide a chassis of the above character and which is borne on wheels in which one of said wheels is movable between two operative positions—one when trimming and the other when mowing.

A further object of the invention is to provide a mower-trimmer chassis in which two front traction wheels are provided and providing for releasably locking the operative positions of the wheels for edge-trimming so facile change of position of one of said wheels may be had for mowing.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawing. However, said drawing merely shows, and the following description merely describes, one embodiment of the present invention, which is given by way of illustration or example only.

In the drawing, like reference characters designate similar parts in the several views.

FIG. 1 is a side elevational view of a mower-trimmer chassis according to the present invention, and shown in the edge-trimming position thereof.

FIG. 2 is a similar view showing said chassis in the mowing position.

FIG. 3 is a fragmentary plan view of the left hand end of the chassis as in FIG. 1.

FIG. 4 is a longitudinal sectional view as taken on the line 4—4 of FIG. 3.

The mower-trimmer that is illustrated comprises a chassis base 5 that, in the usual way, mounts an engine E (preferably internal combustion) and is provided with a pair of rear wheels 6 on an axle 7 carried by the rear of said base, two side-by-side frames 8 and 9 disposed at the front of chassis frame 5 and mounted on an axle 10 parallel to the axle 7, a wheel 11 carried by the frame 8 and a wheel 12 carried by the frame 9, means 13 to releasably connect said frames 8 and 9 so the four wheels 6 and 11 and 12 will support the chassis base 5, a spring 14 imposing a bias on the frame 9 to bias the same in a direction to lift the wheel 12 thereof out of alignment with the wheel 11, thereby providing a clear space beneath the latter frame and wheel, and means 15 carried by the chassis base at one side thereof and adjustable between an edge-trimming position (FIG. 1) at the side of the base 5 and a grass-mowing position (FIG. 2) at least partly occupying the mentioned space beneath the raised frame 9 and its wheel 12. The present machine is shown with means 16 for adjusting the connected frames 8 and 9 angularly relative to the chassis base 5 for adjusting the relationship of the means 15 relative to the ground to vary the depth at which trimming will be carried out and the mowed height of the grass.

The base 5 is shown as comprising a base plate 20 and a pair of side rails 21 between which said plate spans. The mentioned engine E is mounted on said plate. The rear axle 7 extends between the rear ends of rails 21 with the rear wheels 6 preferably disposed on the outsides of said rails. The axle 10 spans between the front ends of the rails 21.

The wheel frame 8 comprises a pair of spaced arms 22 and 23 that are affixed to and extend from a sleeve 24 rotationally mounted on the axle 10. The arm 22 is provided with an upwardly directed apertured ear 25, and the arm 23 comprises two similar arm members, one with an apertured ear 26 aligned with the ear 25 of arm 22, and the other with an apertured ear 27 that is directed oppositely to the ears 25 and 26. Except that they are oppositely turned, the arm members of the arm 23 are alike. The ends of the arms 22 and 23 are connected by a wheel axle 28. Said frame 8 is disposed within and adjacent to one base rail 21 so that the wheel 11 on the axle 28 is located inward of said base rail.

The wheel frame 9 is located inward of and adjacent the opposite rail 21 and comprises a pair of spaced arms 29 and 30 that are affixed to and extend from a sleeve 31 on the axle 10. Said arms 29 and 30 are the same length as arms 22 and 23, above described. The arm 29 is shown without an ear, as in arms 22 and 23, and the arm 30 is provided with an apertured ear 32 similar to and aligned with the ears 25 and 26. The ends of arms 29 and 30 are connected by a wheel axle 33 on which is carried the wheel 12.

The means 13 releasably connects the wheel frames 8 and 9 in side-by-side relation, the same comprising a lock pin 34 that is passed through the aligned apertured ears 25, 26 and 32 and is biased to locking position by a spring 35 having one end that abuts the side of ear 26 with the opposite end abutting a cross pin 36 on the lock pin 34. Thus, the pin 34 is carried by the two ears 25 and 26 of frame 8, and the spring 35 biases said pin so its end 37 enters into the apertured ear 32 of frame 9 thereby locking the frames 8 and 9 together.

In this case, the means 21 is provided for adjusting the angle of the locked-together frames 8 and 9 relative to the chassis base 5. Said means is connected to the mentioned ear 27 of frame 8 and comprises a link 38 that extends rearwardly from ear 27 and connects with a lever 39 on the rear axle 7. Control means, exemplified by the rod 40, may be manipulated by the operator (that controls the present device by means of a handle 41) to adjust said angle which, as will later be seen, regulates the operative position of the means 14, both for edge trimming and for grass cutting.

The spring 14 is provided for biasing the frame 9 to a raised position when the lock pin 34 is retracted. Said spring is shown as coiled around the axle 10 with one end 42 bearing against the upper edge of the arm 23 and the opposite end 43 bearing against the lower edge of arm 30. Thus, when pin 34 is retracted, the bias of spring 14 is released and the frame 29 automatically swings up to the position of FIG. 2 with its wheel 12 encountering and being arrested by a stop 44 on the chassis base 5.

The means 15, per se, forms no part of the present invention, the same exemplifying a device that has two operative positions, one to trim and the other to mow. The means 15 that is shown comprises a bracket 45 affixed to the side of base 5 adjacent which the retractable frame 9 is disposed, a bearing 46 carried by said bracket, a rotationally adjustable shaft 47 extending from said bearing, means 48 to rotate and lock said shaft 47 in two or more selected positions through a range of about 90° around the axis of shaft 47, a bearing 49 at right angles to and on the end of shaft 47, a rotary cutter blade 50 on an axle 51 in said bearing 49, and a shield or hood 52 for said cutter and affixed to bearing 49 by means of a clamp 53.

The edge-trimming position of FIG. 1 has the cutter 50 and hood 52 to the side of the frame 9 and its wheel 12. Hence, said frame and wheel may be in tractive position to support and steady the chassis on pavement, curbs, etc., that are adjacent to where trimming is being effected. The mowing position of FIG. 2 brings the cutter 50 in position to rotate in a path part of which is occupied by the wheel 12. As a consequence, it is necessary to first release frame 9 so the same may automatically retract upwardly before the means 15 is adjusted to mowing position.

The pulley and belt arrangement 54 drives the cutter blade 50 in both positions of the means 15.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. In a mower-trimmer chassis having rear support wheels and having selectively positioned cutting means to edge-trim in one position and mow grass in another, the improvement that comprises
   (a) a first front support frame on said chassis and provided with an axle and with a first support wheel on said axle,
   (b) a second front support frame on said chassis and provided with an axle and with a second support wheel on the latter axle,
   (c) release means carried by one support frame and releasably engaged with the other support frame to connect said frames to hold the wheels thereof and their respective axles in aligned relation, and
   (d) spring means to bias the second front support frame and the wheel thereof to a raised non-supporting position upon release of the release means, to leave a clear space beneath said raised support and wheel in which the cutting means, in the grass-mowing position thereof, is adapted to operate.

2. In a mower-trimmer chassis according to claim 1, the further improvement that comprises means connected to one frame to adjust both frames and the wheels thereof simultaneously angularly relative to the chassis when said frames are held in aligned relation.

3. In a mower-trimmer chassis having rear support wheels and having selectively positioned cutting means to edge-trim in one position and mow grass in another, the improvement that comprises
   (a) a first front support frame on said chassis and provided with an axle and with a first support wheel on said axle,
   (b) a second front support frame pivotally mounted on the chassis and provided with an axle and with a second support wheel on the latter axle,
   (c) release means carried by one support frame and releasably engaged with the other support frame to connect said frames to hold the wheels thereof and their respective axles in aligned relation, and
   (d) spring means engaged with the pivotally mounted frame to pivotally bias said frame and the wheel thereof to retracted non-supporting position, upon release of the release means, to leave a clear space in which the cutting means, in the grass-mowing position thereof, is adapted to operate.

4. In a mower-trimmer chassis according to claim 3, the further improvement that comprises means connected to one frame to adjust the angle thereof and of the second frame relative to the chassis when said frames are held in aligned relation.

5. In a mower-trimmer chassis according to claim 3, the further improvement that comprises means connected to one frame to adjust the angle thereof and of the second frame relative to the chassis when said frames are held in aligned relation, a horizontal axle being provided to connect said first frame and the chassis and around which the mentioned change of angle of both frames is made.

6. In a mower-trimmer chassis according to claim 3, the further improvement that comprises means connected to one frame to adjust the angle thereof and of the second frame relative to the chassis when said frames are held in aligned relation, a horizontal axle being provided to connect said first frame and the chassis and around which the mentioned change of angle of both frames is made, said axle being extended to hingedly mount the second frame.

References Cited in the file of this patent

UNITED STATES PATENTS

| | | |
|---|---|---|
| 2,791,875 | Faas | May 14, 1957 |
| 2,877,617 | Horner | Mar. 17, 1959 |
| 2,909,021 | McLane | Oct. 20, 1959 |